No. 779,615. PATENTED JAN. 10, 1905.
W. B. MARTIN.
SAND WASHING AND SAVING MACHINE
APPLICATION FILED MAY 28, 1904.
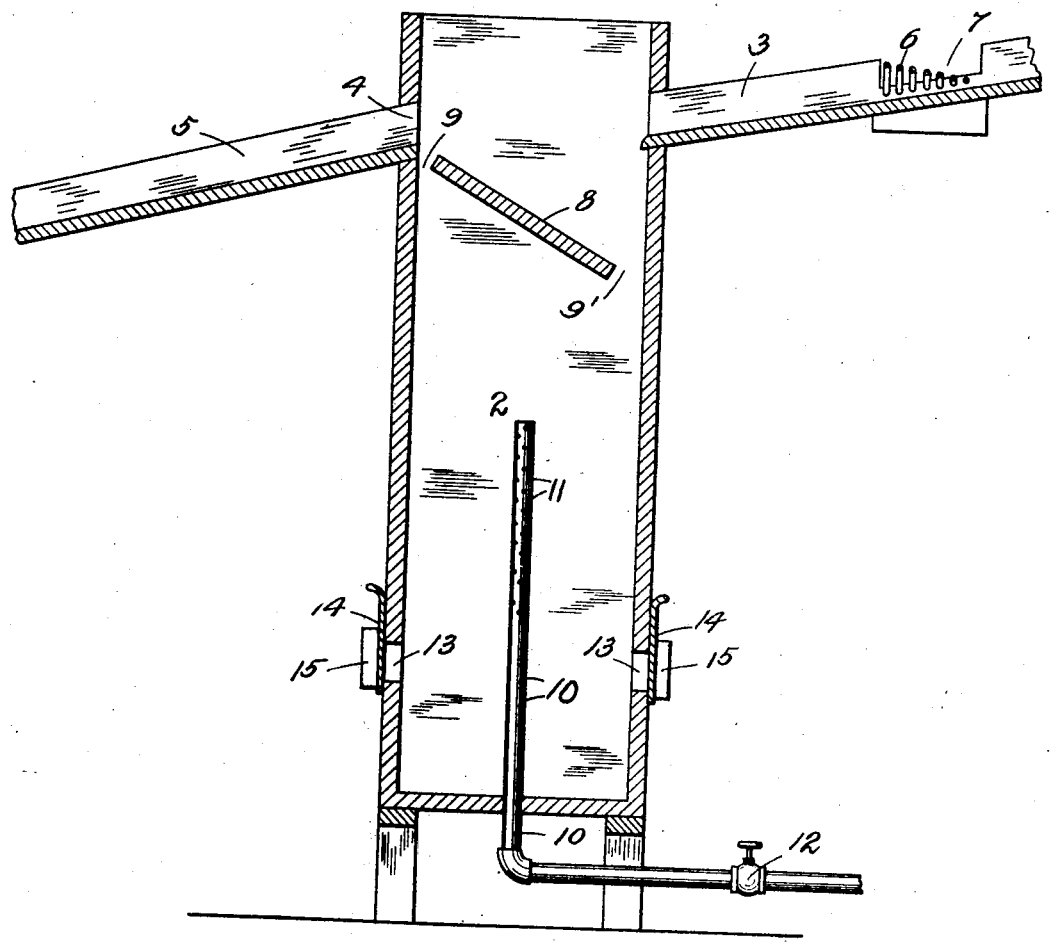

No. 779,615.

Patented January 10, 1905

UNITED STATES PATENT OFFICE.

WILLIAM B. MARTIN, OF SEATTLE, WASHINGTON.

SAND WASHING AND SAVING MACHINE.

SPECIFICATION forming part of Letters Patent No. 779,615, dated January 10, 1905.

Application filed May 28, 1904. Serial No. 210,210.

*To all whom it may concern:*

Be it known that I, WILLIAM B. MARTIN, a citizen of the United States, residing at Seattle, in the county of King and State of Washington, have invented certain new and useful Improvements in Sand Washing and Saving Machines, of which the following is a specification, reference being had therein to the accompanying drawing.

This invention relates to sand washing and saving devices.

The object of the invention is to provide an apparatus of simple and inexpensive construction and one which can be easily and economically operated for separating gravel, dirt, and other substances from sand intended for building and other purposes where it is required, or at least advantageous, to use only clean sand. I attain these results by the apparatus hereinafter described, and illustrated in the accompanying drawing, which is a vertical longitudinal section of a machine embodying my invention.

In the drawing, 2 represents tank or receptacle, preferably box-shaped, and which is supplied with water and the material carrying the sand through a sluiceway or chute 3 entering the tank at one end and in proximity of its top. Upon the opposite end of the tank and also in proximity of the top is an outlet 4, through which the lighter or refuse particles are delivered into a discharge-chute 5.

Interposed within the chute 4 is a screen or "grizzly" 6, comprised, preferably, of a series of transversely-disposed bars which are inclined toward one side for the purpose of screening the material and discharging rocks, lumps of clay, &c., through an outlet 7, provided in the chute.

Positioned within the tank and intermediate the chutes 3 and 5 is an inclined deflector-plate 8, which extends entirely across the tank, but is of such length as to provide openings 9 and 9', through which the sand gravitates into the space thereunder. A water-supply pipe 10 projects upwardly into the tank, and the part interiorly thereof is perforated, as indicated by 11, and is provided exteriorly of the tank with a stop-cock, such as 12. Discharge-apertures 13 are provided in the tank at some distance from its bottom, through which the cleaned sand is from time to time delivered. These apertures are severally provided with a suitable closure or gate 14, which may be advantageously operated in marginal slide-cleats 15.

The operation of the invention is as follows: The material being conducted, by means of water, through the supply-chute is delivered with some force against the deflector-plate, where the lighter dirt particles are separated and borne by the deflected current of water into the discharge-chute. The remainder of the material, mostly sand, passes through the interstices 9 or 9' into the space below, and, unless the material is very dirty, will be sufficiently clean for ordinary purposes. Should it be desired, however, to make the sand extremely clean, as demanded for certain uses, then water is admitted under pressure into the receptacle through said perforated pipe, which causes the ebullition of the collected material to thoroughly wash the same and further segregate the foreign substances from the sand, which if it be of less specific weight flows off with the water through opening 9 to the discharge-chute, or if heavier it settles in the bottom of the tank below the level of the apertures 13. When the sand is deemed to be clean enough, it is withdrawn, accompanied with some water, through said apertures upon opening the gates thereof.

The invention is well adapted for the purposes for which intended and marks a decided advance in the art.

Having described my invention, what I claim as new, and desire to secure by Letters Patent, is—

The herein-described apparatus, comprising a tank having discharge-openings in its walls near the bottom thereof, a supply-chute discharging into the upper portion of the tank, a screen in the supply-chute, a discharge-chute leading from the tank opposite to the supply-chute, an inclined deflector-plate within the tank and wholly below the supply and overflow-discharge levels and of such length as to substantially close the top of the tank and leave only narrow openings between the walls of the tank, and a water-pipe projecting interiorly of the tank below the deflector-plate.

In testimony whereof I affix my signature in presence of two witnesses.

WILLIAM B. MARTIN.

Witnesses:
 PIERRE BARNES,
 HENRY S. NOON.